United States Patent
Kodama et al.

[11] Patent Number: 6,024,133
[45] Date of Patent: Feb. 15, 2000

[54] FUEL TRANSPORTING HOSE HAVING INNER LAYER MADE OF FLUORINE-CONTAINED RESIN

[75] Inventors: Tsutomu Kodama, Komaki; Kazuhiro Kato, Nagoya, both of Japan

[73] Assignee: Tokai Rubber Industries, Ltd., Japan

[21] Appl. No.: 08/101,000

[22] Filed: Aug. 3, 1993

[30] Foreign Application Priority Data

| Aug. 7, 1979 | [JP] | Japan | 4-211511 |
| Aug. 7, 1992 | [JP] | Japan | 4-211510 |
| Sep. 21, 1992 | [JP] | Japan | 4-251722 |
| Sep. 21, 1992 | [JP] | Japan | 4-251723 |

[51] Int. Cl.$^7$ ..................................................... F16L 11/04
[52] U.S. Cl. ......................... 138/126; 138/137; 138/141; 138/DIG. 3
[58] Field of Search ................ 138/DIG. 3, 123, 138/124, 125, 126, 127, 137, 141, 153

[56] References Cited

U.S. PATENT DOCUMENTS

| 3,828,112 | 8/1974 | Johansen et al. | 138/137 |
| 4,259,991 | 4/1981 | Kutnyak | 138/141 |
| 4,261,390 | 4/1981 | Belofsky | 138/153 |
| 4,293,150 | 10/1981 | Press | 285/149 |
| 4,330,017 | 5/1982 | Satoh et al. | 138/126 |
| 4,887,647 | 12/1989 | Igarashi et al. | |
| 5,062,456 | 11/1991 | Cooke et al. | 138/125 |
| 5,081,326 | 1/1992 | Usui | 138/141 |
| 5,124,878 | 6/1992 | Martucci | 138/DIG. 3 |
| 5,192,476 | 3/1993 | Green | 264/127 |

FOREIGN PATENT DOCUMENTS

| 0385731 | 9/1990 | European Pat. Off. . |
| 8904325 | 7/1990 | Germany . |
| 49-7938 | 2/1974 | Japan . |

Primary Examiner—James F. Hook
Attorney, Agent, or Firm—Parkhurst & Wendel, L.L.P

[57] ABSTRACT

A fuel transporting hose used in a fuel pipe system is disclosed which includes an inner layer made of a fluorine-contained resin, and an outer layer made of a rubber material and formed on an outer surface of the inner layer. The outer layer has a thickness which is 5 to 30 times as that of the inner layer.

7 Claims, 1 Drawing Sheet

FUEL TRANSPORTING HOSE HAVING INNER LAYER MADE OF FLUORINE-CONTAINED RESIN

BACKGROUND OF THE INVENTION

1. Field of the Invention

The present invention relates to a fuel transporting hose which is suitably used in a fuel pipe system of an automobile, for transporting a liquid such as gasoline or a gas.

2. Discussion of the Related Art

There are known various kinds of hoses made of various materials, for use in a fuel pipe system of an automobile or other vehicle. Such a hose may be used as a fuel pipe itself or as a connector for connecting fuel pipes. For example, there is known a hose which consists of a resin tube made of a fluorine-contained resin, and a reinforcing layer formed by braiding a metallic wire on the outer circumferential surface of the resin tube.

The above type of the hose provides excellent resistance to deformation due to appropriate rigidity of the fluorine-contained resin used therein, and also provides high degrees of resistance to sour gasoline and gasoline impermeability. Further, this type of hose with a reinforcing layer in the form of the braided wire exhibits sufficiently high wear resistance and shock resistance. In some cases, the thickness of the resin tube is reduced so as to reduce the amount of expensive fluorine-contained resin to be used, which leads to a reduced cost of manufacturing of the hose. However, the hose with the thin resin tube may be undesirably deformed when supply of gasoline through the hose is temporarily stopped with a result of the inside of the hose being evacuated or subjected to negative pressure.

The fuel transporting hose of the above type has another problem. Namely, the inner wall of the hose tends to be electrically charged, due to static electricity caused by friction between the inner wall and a fuel liquid such as gasoline. If a voltage higher than a given level appears across the hose, a spark may take place between the hose and metallic parts of an automobile body supporting the hose, and the spark may form holes through the hose, or may cause the fuel to take fire. Thus, the hose is unsatisfactory in its resistance to firing.

SUMMARY OF THE INVENTION

It is therefore an object of the present invention to provide a fuel transporting hose used in a fuel pipe system of an automobile, which is available at a reduced cost, and which provides excellent resistance to deformation and excellent resistance to firing, as well as high degrees of resistance to sour gasoline, gasoline impermeability, wear resistance and shock resistance.

The above object may be accomplished according to the principle of the present invention, which provides a fuel transporting hose used in a fuel pipe system, comprising an inner layer made of a fluorine-contained resin, and an outer layer made of a rubber material and formed on an outer surface of the inner layer, the outer layer having a thickness which is 5 to 30 times as that of the inner layer.

Studies were conducted by the inventors of the present invention in an attempt to provide a fuel transporting hose which is available at a reduced cost, and which has excellent resistance to deformation as well as high degrees of resistance of various kinds as described above. To this end, the inner layer of the present fuel transporting hose is formed of the fluorine-contained resin, and the outer layer made of a rubber material is formed on the inner layer, such that the thickness of the outer layer is held in the above-indicated range with respect to that of the inner layer. The thus formed hose is excellent in the gasoline impermeability, resistance to sour gasoline, wear resistance and shock resistance, due to the use of the fluorine-contained resin for the inner layer. Further, the reduced thickness of the inner layer leads to reduction in the amount of use of expensive fluorine-contained resin, whereby the hose can be manufactured at a reduced cost. Since the inner layer made of the fluorine-contained resin has suitably controlled rigidity and elasticity, the hose as a whole is prevented from deforming even when the supply of gasoline through the hose is temporarily stopped and the inside of the hose is subjected to negative pressure, for example. Thus, the fuel transporting tube of the present invention has excellent resistance to deformation. Moreover, the present fuel transporting hose consists only of two layers, whereby the hose can be manufactured with ease and high efficiency.

According to one feature of the invention, the fluorine-contained resin of the inner layer may contain an electrically conductive additive. As a result of studies by the inventors on the resistance of the hose to firing, it was revealed that if electrical conductivity is given to the inner layer of the hose which contacts with a fuel flowing therethrough, the static electricity which occurs due to friction between the fuel and the inner wall of the hose normally escapes through the opposite ends of the hose. Consequently, the inner wall of the hose is not electrically charged, thus avoiding occurrence of spark due to the static electricity, and resultant firing. Thus, the fuel transporting hose having the electrically conductive inner layer exhibits excellent resistance to firing.

BRIEF DESCRIPTION OF THE DRAWINGS

The above and optional objects, features and advantages of the present invention will be better understood by reading the following detailed description of its presently preferred embodiment, when considered in conjunction with the accompanying drawings, in which.

DETAILED DESCRIPTION OF THE INVENTION

The fuel transporting hose of the present invention for use in a fuel pipe system of an automobile is composed of an inner layer made of a fluorine-contained resin, and an outer layer made of a rubber material and formed on the inner layer.

The fluorine-contained resin or fluororesin used for forming the inner layer of the hose may be selected from polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

The above-indicated fluorine-contained resin may be given electrical conductivity. For example, the resin contains an electrically conductive additive dispersed therein, such that the inner layer has a volume resistivity of not higher than $10^{10}$ Ω·cm. The electrically conductive additive may be selected from carbon black, fine stainless steel fiber, and others.

The rubber material used for forming the outer layer may be selected from: NBR; H-NBR (hydrogenated NBR); ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

The instant fuel transporting hose may be produced in the following manner. Initially, a tubular body which provides the inner layer is formed by extruding the fluorine-contained resin from an extruder onto a mandrel. Then, the rubber material as indicated above is extruded on the outer circumferential surface of the tubular body (inner layer), to form the outer layer thereon. These inner and outer layers are then formed into an integral structure by heat and vulcanization, and pulled out of the mandrel. Thus, a double-layered hose for use in a fuel pipe system of an automobile is produced. The vulcanization indicated above is generally effected for 30–60 min., at a temperature of 150–160° C. Where the fluorine-contained resin of the inner layer contains the electrically conductive additive as described above, the content of the conductive additive is preferably determined so that the inner layer has a volume resistivity of not higher than $10^{10}$ Ω·cm. For instance, the fluorine-contained resin contains 3–16 parts by weight of the conductive additive, per 100 parts by weight of the fluorine-contained resin.

Figure 1:
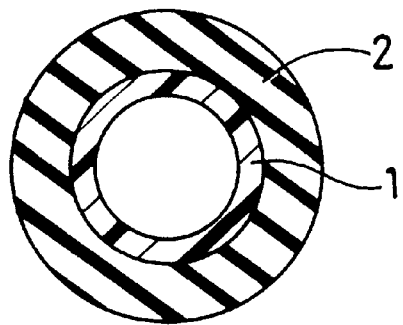
FIG. 1 is a cross sectional view of one embodiment of the present invention, in the form of a fuel transporting hose used in a fuel pipe system of an automobile.
Figure 2:
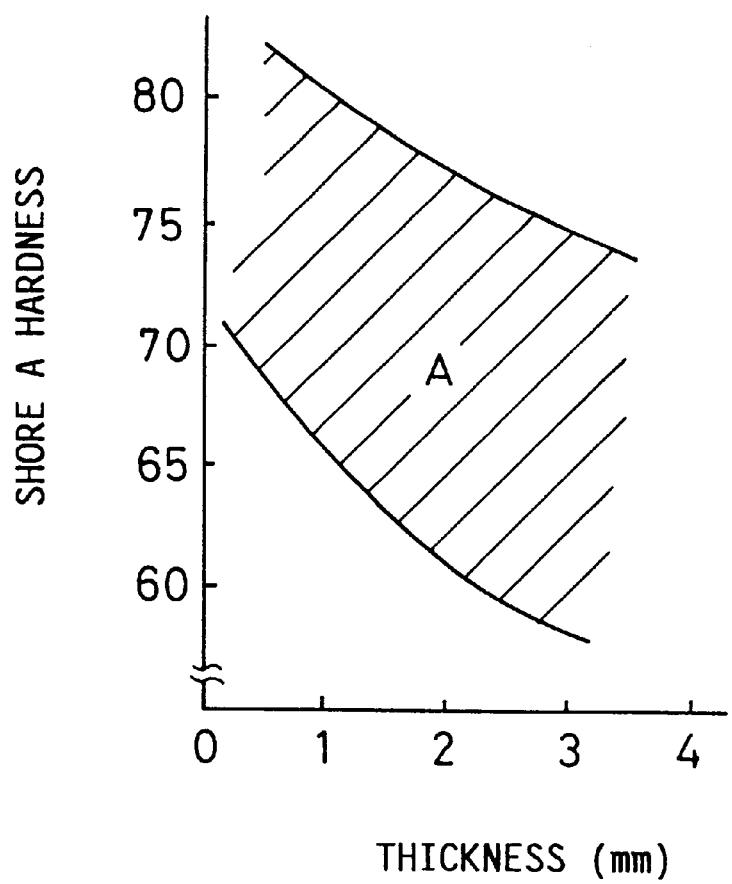
FIG. 2 is a graph showing the relationship between the thickness (mm) and hardness of the outer layer.

The fuel transporting hose produced in the above-described manner is illustrated in FIG. 1, which consists of the inner layer 1 formed of the fluorine-contained resin, and the outer layer 2 formed of the rubber material. An electrically conductive additive may be added to the fluorine-contained resin of the inner layer 1. In the instant fuel transporting hose, the thickness of the outer layer 2 is controlled to be 5 to 30 times as that of the inner layer 1. Since the thickness of the inner layer 1 is made sufficiently smaller than the outer layer 2, the cost of manufacturing of the hose can be reduced with a reduced amount of expensive fluorine-contained resin used in the hose, though the hose still exhibits high resistance to deformation. More specifically, the thickness of the inner layer 1 is preferably held within a range of 0.1–0.2 mm, and the thickness of the outer layer 2 is preferably held within a range of 2–3 mm. In addition, the Shore A hardness of the outer layer 2 as measured is preferably controlled to be not smaller than 57.3, more preferably, to be in the range of 60–80. The graph of FIG. 2 indicates the relationship between the thickness and hardness of the outer layer 2. In this graph, the thickness and hardness of the outer layer 2 are well balanced in the hatched area "A". It will be apparent from the graph of FIG. 2 that when the thickness of the outer layer 2 is in the vicinity of 2 mm, the Shore A hardness is favorably held in the above desired range of 68.0–79.4.

In the above-described fuel transporting hose of the invention, a fiber reinforcing layer may be formed on an outer circumferential surface of the outer layer 2, using suitable reinforcing fiber. This fiber reinforcing layer is formed by braiding or spiraling, using synthetic fiber, such as nylon fiber, polyester fiber or aramid fiber, or natural fiber such as cotton fiber. With the fiber reinforcing layer thus formed, a layer of air is formed in the fibrous structure of the layer, so as to assure improved heat insulation of the hose. Accordingly, the inside of the hose is thermally insulated from heat outside the hose, so that the fuel flowing through the hose is not affected by the heat transmitted through the wall of the hose.

EXAMPLES

There will be described in detail some examples of the fuel transporting hose of the present invention, along with comparative examples.

Examples 1–4

According to the method as described above, four double-layered fuel transporting hoses (having an inside diameter of 6 mm) for use in a fuel pipe system of an automobile were produced as Examples 1 through 4, using the materials as indicated in TABLES 1 and 2 below. In these TABLES, there is also indicated Shore A hardness of the outer layer of each Example.

TABLE 1

|       |                 | Example 1 | Example 2 |
|-------|-----------------|-----------|-----------|
| Inner | Material        | PVDF      | PVDF      |
| layer | Thickness(mm)   | 0.1       | 0.1       |
| Outer | Material        | ECO       | ECO       |
| layer | Thickness(mm)   | 2.0       | 3.0       |
|       | Shore A hardness| 62.7      | 62.7      |

TABLE 2

|       |                 | Example 3 | Example 4 |
|-------|-----------------|-----------|-----------|
| Inner | Material        | CTFE      | CTFE      |
| layer | Thickness(mm)   | 0.2       | 0.2       |
| Outer | Material        | CSM       | CSM       |
| layer | Thickness(mm)   | 2.0       | 3.0       |
|       | Shore A hardness| 74.7      | 74.7      |

Examples 5–10

According to the method as described above, seven double-layered fuel transporting hoses (having an inside diameter of 6 mm) for use in a fuel pipe system of an automobile were produced as Examples 5 through 10, using the materials as indicated in TABLES 3–5 below. In these TABLES, Shore A hardness of the outer layer of each Example is also indicated.

TABLE 3

|       |                        | Example 5           | Example 6A        | Example 6B        |
|-------|------------------------|---------------------|-------------------|-------------------|
| Inner | Material               | PVDF                | PVDF              | PVDF              |
| layer | Carbon black           | Medium-purity       | High-purity       | High-purity       |
|       | Content*1 (parts)      | 12                  | 8                 | 4                 |
|       | Volume resistivity (Ω·cm) | $4.6 \times 10^6$ | $4.8 \times 10^4$ | $4.8 \times 10^5$ |
|       | Thickness(mm)          | 0.1                 | 0.1               | 0.1               |
| Outer | Material               | ECO                 | ECO               | ECO               |
| layer | Thickness(mm)          | 2                   | 2                 | 2                 |
|       | Shore A hardness       | 62.7                | 62.7              | 62.7              |

*1parts by weight per 100 parts by weight of fluorine-contained resin

TABLE 4

|  |  | Example 7 | Example 8 |
|---|---|---|---|
| Inner layer | Material | PVDF | CTFE |
|  | Carbon black Content*1 (parts) | High-purity 8 | Medium-purity 12 |
|  | Volume resistivity ($\Omega \cdot cm$) | $3.7 \times 10^4$ | $4.9 \times 10^6$ |
|  | Thickness(mm) | 0.1 | 0.2 |
| Outer layer | Material | ECO | CSM |
|  | Thickness(mm) | 3 | 2 |
|  | Shore A hardness | 62.7 | 74.7 |

*1 parts by weight per 100 parts by weight of fluorine-contained resin

TABLE 5

|  |  | Example 9 | Example 10 |
|---|---|---|---|
| Inner layer | Material | CTFE | CTFE |
|  | Carbon black Content*1 (parts) | High-purity 8 | High-purity 8 |
|  | Volume resistivity ($\Omega \cdot cm$) | $3.9 \times 10^4$ | $4.5 \times 10^4$ |
|  | Thickness(mm) | 0.2 | 0.2 |
| Outer layer | Material | CSM | CSM |
|  | Thickness(mm) | 2 | 3 |
|  | Shore A hardness | 74.7 | 74.7 |

*1 parts by weight per 100 parts by weight of fluorine-contained resin

Comparative Example 1

As Comparative Example 1, there was produced a hose consisting of a single layer made of nylon 11 and formed by using an extruder.

Comparative Example 2

As Comparative Example 2, there was produced a double-layered hose which consists of a resin layer formed of a fluorine-contained resin (PVDF) and a reinforcing layer formed from a metallic wire. The resin layer was formed by extruding the fluorine-contained resin by means of an extruder, and the reinforcing layer is formed by braiding on the outer surface of the resin layer.

With respect to the above-described fuel transporting hoses of Examples 1–10 and Comparative Examples 1 and 2, measurements and evaluation were conducted in respect of the bursting pressure, gasoline impermeability, resistance to sour gasoline, and resistance to deformation. In addition, with respect to the hoses of Examples 5–10 and Comparative Examples 1 and 2, measurement and evaluation were conducted in respect of the volume resistivity and resistance to firing. The results are indicated in TABLE 6 through TABLE 10. The bursting pressure and other properties of each specimen of the hoses were measured and evaluated in the following manners.

[Bursting Pressure]

A pressure (hydraulic pressure) applied to each specimen of the hoses was continuously increased until the hose burst, and the maximum pressure was measured at which the burst of the hose occurred or the water leaked from the hose through pin-holes.

[Gasoline Impermeability]

Two kinds of gasoline, i.e., a test gasoline and a mixed gasoline which is a 50:50 volume blend of the test gasoline and methanol were prepared. The test gasoline and mixed gasoline were sealed into respective specimens of the hoses, which were then left at a temperature of 40° C., and the amount of reduction in the weight of the gasoline (g/m² per day) was measured. The same measurement was conducted on a conventional hose which has the same inside diameter as the above specimens, and includes an inner layer made of fluororubber (FKM), an intermediate layer made of ECO, an outer layer made of ECO and formed outwardly of the intermediate layer, and a fiber reinforcing layer formed between the intermediate layer and the outer layer. The measurement result of the conventional hose is used as a reference value "1", and the measurement results, that is, gasoline impermeability values of Examples 1–5 and Comparative Examples 1 and 2 are indicated on the basis of the reference value in TABLE 4 through TABLE 6.

[Resistance to sour gasoline]

The sour gasoline containing peroxides was circulated through each specimen of the hoses, and any crack or other abnormality which appeared on the inner surface of the hose was recognized. The circulation of the sour gasoline was effected at 40–60° C., under a pressure of 2.5 kgf/cm². In the TABLES, "⊚" indicates that no abnormality was recognized in the specimen, and "○" indicates that almost no abnormality was recognized, while "X" indicates that some abnormality was recognized.

[Resistance to deformation]

Each specimen of the hoses was subjected to a negative pressure of –600 mmHg. In the TABLES, "X" indicates that the hose was choked or closed due to the negative pressure, and "O" indicates that almost no deformation of the hose was recognized, while "⊚" indicates that no deformation was recognized.

[Resistance to firing]

A metallic needle was brought close to each specimen of the hoses to which an electrical charge of 30–50 kV was applied, and spark phenomena were observed.

[Electrical resistance]

The volume resistivity ($\Omega \cdot cm$) of each specimen of the hoses was measured according to JIS (Japanese Industrial Standard) (K-6911).

TABLE 6

|  | Example | |
|---|---|---|
|  | 1 | 2 |
| Bursting Pressure (kgf/cm²) | 30 | 45 |
| Gasoline Impermeability |  |  |
| Test gasoline | 0.5 or less | 0.5 or less |
| Mixed gasoline | 0.5 or less | 0.5 or less |
| Resistance to sour gasoline | ⊚ | ⊚ |
| Resistance to deformation | ⊚ | ⊚ |

TABLE 7

|  | Example | |
|---|---|---|
|  | 3 | 4 |
| Bursting Pressure (kgf/cm²) | 40 | 50 |
| Gasoline Impermeability |  |  |
| Test gasoline | 0.5 or less | 0.5 or less |
| Mixed gasoline | 0.5 or less | 0.5 or less |
| Resistance to sour gasoline | ⊚ | ⊚ |
| Resistance to deformation | ⊚ | ⊚ |

TABLE 8

|  | Example | | |
|---|---|---|---|
|  | 5 | 6 | 7 |
| Bursting Pressure (kgf/cm$^2$) | 30 | 30 | 45 |
| Gasoline Impermeability |  |  |  |
| Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Volume resistivity (Ω · cm) | 4.6 × 10$^6$ | 4.8 × 10$^4$ | 3.7 × 10$^4$ |
| Resistance to firing | ⊚ | ⊚ | ⊚ |
| Resistance to deformation | ⊚ | ⊚ | ⊚ |

TABLE 9

|  | Example | | |
|---|---|---|---|
|  | 8 | 9 | 10 |
| Bursting Pressure | 40 | 40 | 50 |
| Gasoline Impermeability |  |  |  |
| Test gasoline | 0.5 or less | 0.5 or less | 0.5 or less |
| Mixed gasoline | 0.5 or less | 0.5 or less | 0.5 or less |
| Resistance to sour gasoline | ⊚ | ⊚ | ⊚ |
| Volume resistivity (Ω· cm) | 4.9 × 10$^6$ | 3.9 × 10$^4$ | 4.5 × 10$^4$ |
| Resistance to firing | ⊚ | ⊚ | ⊚ |
| Resistance to deformation | ⊚ | ⊚ | ⊚ |

TABLE 10

|  | Comparative Example | |
|---|---|---|
|  | 1 | 2 |
| Bursting pressure (kgf/cm$^2$) | 80–100 | 200 or higher |
| Gasoline Impermeability |  |  |
| Test gasoline | 0.5-1.0 | 0.5 |
| Mixed gasoline | 10-15 | 0.5 |
| Resistance to sour gasoline | Δ | ⊚ |
| Volume resistivity (Ω· cm) | 1.4 × 10$^{14}$ | 1.7 × 10$^{15}$ or higher |
| Resistance to firing | × | × |
| Resistance to deformation | ⊚ | × |

It will be understood from TABLE 6 through TABLE 10 that Comparative Example 1 has insufficient resistance to sour gasoline, and Comparative Example 2 has poor resistance to deformation. In contrast, Examples 1–10 have excellent properties in terms of the gasoline impermeability, resistance to sour gasoline and resistance to deformation. Further, such excellent properties can be achieved even with the fluorine-contained resin layer as the inner layer having a relatively small thickness. This leads to a reduced amount of expensive fluorine-contained resin to be used, thus permitting reduction in the cost of manufacture of the hose.

It will be understood from TABLES 8, 9 and 10 that Comparative Examples 1 and 2 have poor resistance to firing, and that Comparative Example 2 has poor resistance to deformation. In contrast, Examples 5–10 according to the present invention are excellent in terms of the resistance to firing and resistance to deformation, as well as the gasoline impermeability and resistance to sour gasoline. Further, Examples 5–10 have sufficiently high mechanical strength, assuring high degrees of wear resistance and shock resistance.

What is claimed is:

1. A fuel transporting hose used in a fuel pipe system, comprising:

an inner layer comprised of a fluorine-containing resin and having a thickness of 0.1~0.2 mm; and an outer layer comprised of a rubber material and formed on an outer surface of said inner layer, said outer layer having a thickness of 2~3 mm and consisting of a single layer, said thickness of said outer layer being 10 to 30 times as that of said inner layer.

2. A fuel transporting hose as defined in claim 1, wherein said fluorine-containing resin of said inner layer contains an electrically conductive additive.

3. A fuel transporting hose as defined in claim 2, wherein said inner layer has a volume resistivity of not higher than 10$^{10}$ Ω·cm.

4. A fuel transporting hose as defined in claim 2, wherein said fluorine-containing resin contains 3–16 parts by weight of said electrically conductive additive, per 100 parts by weight of the fluorine-contained resin.

5. A fuel transporting hose as defined in claim 2, wherein said electrically conductive additive is carbon black or stainless steel fiber.

6. A fuel transporting hose as defined in claim 1, wherein said fluorine-containing resin of said inner layer is selected from the group consisting of: polyvinylidene fluoride (PVDF); polychlorotrifluoroethylene (CTFE); a copolymer of ethylene and chlorotrifluoroethylene (ECTFE); a copolymer of ethylene and tetrafluoroethylene (ETFE); a copolymer of hexafluoropropylene and tetrafluoroethylene (FEP); fluorinated alkoxyethylene resin (PFA); and polytetrafluoroethylene (PTFE).

7. A fuel transporting hose as defined in claim 1, wherein said rubber material of said outer layer is selected from the group consisting of: NBR; H-NBR; ECO; CSM; chlorinated polyethylene rubber (CPE); acrylic rubber (ACM); chloroprene rubber (CR); a blend of NBR and polyvinyl chloride resin (PVC); EPDM; isobutylene-isoprene rubber (IIR); and halogenated butyl rubber.

* * * * *